(12) United States Patent
Chow et al.

(10) Patent No.: US 8,460,631 B2
(45) Date of Patent: Jun. 11, 2013

(54) PROCESSING OF MANGANOUS SULPHATE/DITHIONATE LIQUORS DERIVED FROM MANGANESE RESOURCE MATERIAL

(75) Inventors: Norman Chow, Vancouver (CA); Anca-Mihaela Nacu, Vancouver (CA); Douglas Warkentin, Vancouver (CA); John Wentworth Fisher, Pender Island (CA)

(73) Assignee: American Manganese Inc., White Rock, BC (CA)

( * ) Notice: Subject to any disclaimer, the term of this patent is extended or adjusted under 35 U.S.C. 154(b) by 17 days.

(21) Appl. No.: 13/210,538

(22) Filed: Aug. 16, 2011

(65) Prior Publication Data

US 2012/0207666 A1    Aug. 16, 2012

Related U.S. Application Data

(60) Provisional application No. 61/374,691, filed on Aug. 18, 2010.

(51) Int. Cl.
*C01D 5/00* (2006.01)
(52) U.S. Cl.
USPC ............................. 423/551; 423/553
(58) Field of Classification Search
USPC ................................. 423/551, 553
See application file for complete search history.

(56) References Cited

U.S. PATENT DOCUMENTS

| 2,272,345 | A | * | 2/1942 | Kobe | 423/553 |
| 2,504,097 | A | * | 4/1950 | Wiseman et al. | 423/553 |
| 4,195,070 | A | * | 3/1980 | Allain et al. | 423/498 |
| 5,783,084 | A | * | 7/1998 | Suenkonis | 210/638 |

* cited by examiner

*Primary Examiner* — Timothy Vanoy
(74) *Attorney, Agent, or Firm* — Clark A. Puntigam; Jensen & Puntigam, P.S.

(57) ABSTRACT

The process concerns hydrometallurgical processing of manganese sulphate and manganese dithionate containing liquors and recovery of water therefrom. Sodium sulphate and/or sodium dithionate containing liquors are derived from manganese sulphate and manganese dithionate containing liquids, which are then cooled to produce crystals of sodium sulphate decahydrate and sodium dithionate dehydrate. The sodium sulphate decahydrate and sodium dithionate dehydrate crystals are then heated to a temperature sufficient to decompose the sodium sulphate decahydrate crystals to form anhydrous sodium sulphate crystals, sodium dithionate hydrate crystals and water, after which water is removed from the sodium sulphate and sodium dithionate hydrate crystal. The sodium sulphate and sodium dithionate dehydrate crystals are then heated to form anhydrous sodium sulphate, sulfur dioxide and water or steam. The anhydrous sodium sulphate is then separated from the sulfur dioxide and water.

20 Claims, 4 Drawing Sheets

US 8,460,631 B2

PROCESSING OF MANGANOUS SULPHATE/DITHIONATE LIQUORS DERIVED FROM MANGANESE RESOURCE MATERIAL

PRIOR APPLICATION

This non-provisional application claims the priority of prior U.S. provisional application Ser. No. 61/374,691, filed on Aug. 18, 2010.

TECHNICAL FIELD

The present invention relates to the recovery of water and sodium sulphate from sodium sulphate and sodium dithionate containing liquors such as those derived from hydrometallurgical processing of manganese containing resource material.

BACKGROUND OF THE INVENTION

It is generally known that manganese may be leached from higher valent manganese (Mn) containing resource material, such as manganese dioxide, using sulphur dioxide alone or in combination with sulphuric acid to produce manganous sulphate and manganous dithionate. This is described for example in WO 2004/033738 to Ward:

$$MnO_2 + SO_2 = MnSO_4 \quad [1]$$

$$MnO_2 + 2SO_2 = MnS_2O_6 \quad [2]$$

The manganous dithionate ($MnS_2O_6$) precludes proper control for electrowinning high purity Mn metal and must be removed before electrolysis. Henn et al ("Review of Major Proposed Processes for Recovering Manganese from United States Resources", U.S. Bureau of Mines, Information Circular 8368, 1968) describes different methods of converting $MnS_2O_6$ to $MnSO_4$. One method describes autoclaving the $MnS_2O_6$ containing pregnant leach solution at 230° C. and 600 psi with air. $MnS_2O_6$ conversion to $MnSO_4$ would proceed according to the following reaction:

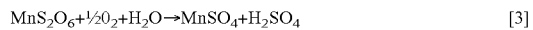

$$MnS_2O_6 + \tfrac{1}{2}O_2 + H_2O \rightarrow MnSO_4 + H_2SO_4 \quad [3]$$

Although autoclaving can convert $MnS_2O_6$ to $MnSO_4$ and $H_2SO_4$, it requires the use of an expensive corrosion resistant pressure vessel. Process challenges with this technique include inefficient use of $SO_2$ and potential precipitation of manganous sulphate due to its inverse solubility with increasing temperature, as shown in FIG. 1. Controlling optimum concentration of Manganous sulphate in solution is desirable for electrowinning as is the need to develop an effective scheme to process the $H_2SO_4$ by-product in combination with the $MnSO_4$. Henn's report mentions that the $H_2SO_4$ could be used to consume non-manganese oxides to form insoluble sulphates. This would involve reacting the pregnant leach solution with more resource material in the autoclave. While not mentioned in the Henn report, a perfect balance between $H_2SO_4$ by-product generation and consumption of non-manganese material to form insoluble products is unlikely. Insufficient acid consuming material would have to be supplemented with the addition of lime to consume excess $H_2SO_4$. Controlled lime addition would be required as over addition may cause manganese precipitation, resulting in loss of product.

One of the techniques described in the Henn report uses evaporation to crystallize $MnSO_4 \cdot H_2O$ from aqueous solution i.e. manganous sulphate containing liquor is evaporated via heating to release water so as to concentrate manganous sulphate above its solubility limit. A report by Allen ("Recovery of Manganese from Low-Grade Ores", Chemical Engineering Progress, Vol 50, No. 1, 1954, pp 9-13) describes methodology to evaporate the pregnant leach solution to form $MnSO_4$ and $MnS_2O_6$ crystals. Sintering the crystals at 1100 to 1200° C. produces a $Mn_3O_4$ product as well as evolve $SO_2$ gas which can be recycled to the leach. The high temperature for sintering was used in this case in order to decompose $MnSO_4$ into $Mn_3O_4$ and $SO_2$.

Prior art techniques for recovering manganese metal from low grade manganese resource material via sulphite leaching techniques resulting in the formation of manganous sulphate ($MnSO_4$) and manganous dithionate ($MnS_2O_6$) containing liquors have the following problems:

1) Destruction of manganous dithionate in the presence of manganous sulphate under conditions which favour undesirable manganous sulphate precipitation i.e. high temperature and pressure plus reactor corrosion due to high temperature sulphuric acid formation (see reaction [3] above), and
2) Expensive evaporative crystallization of manganous sulphate containing liquor.

SUMMARY OF THE INVENTION

Accordingly, disclosed herein is a process for hydrometallurgical processing of manganese sulphate and manganese dithionate containing liquors and recovery of water therefrom, comprises the steps of: deriving sodium sulphate and/or sodium dithionate containing liquors from manganese sulphate and manganese dithionate containing liquids; crystallizing sodium sulphate decahydrate and sodium dithionate dehydrate by cooling sodium sulphate/sodium dithionate containing liquor with or without a vacuum; heating the sodium sulphate decahydrate and sodium dithionate dehydrate crystals to a temperature sufficient to decompose the sodium sulphate decahydrate crystals to form anhydrous sodium sulphate crystals, sodium dithionate hydrate crystals and water; removing water from the sodium sulphate and sodium dithionate hydrate crystals; heating the sodium sulphate and sodium dithionate dehydrate crystals to form anhydrous sodium sulphate, sulfur dioxide and water or steam; and separating the anhydrous sodium sulphate from the sulfur dioxide and water.

BEST MODE FOR CARRYING OUT THE INVENTION

Figure 1:
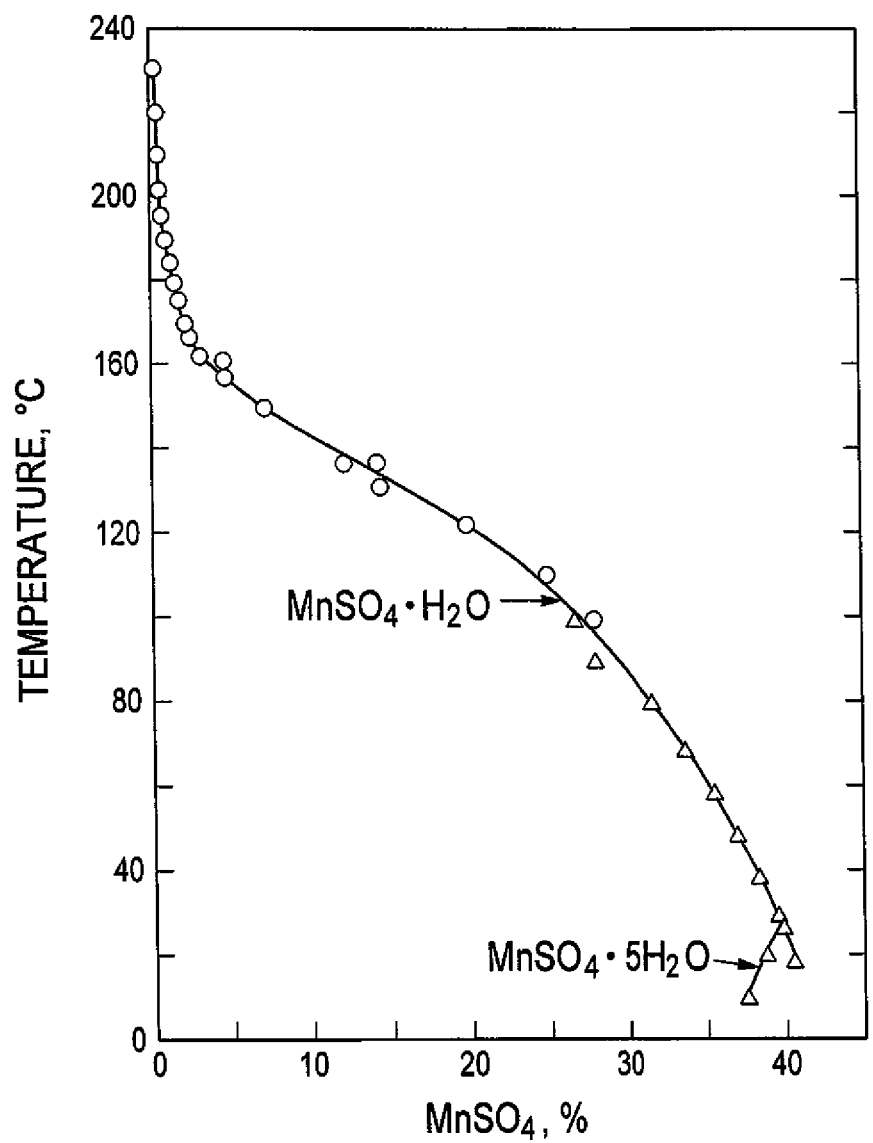
FIG. 1 is a known graph of temperature solubility of manganous sulfate.
Figures 2, 2A:
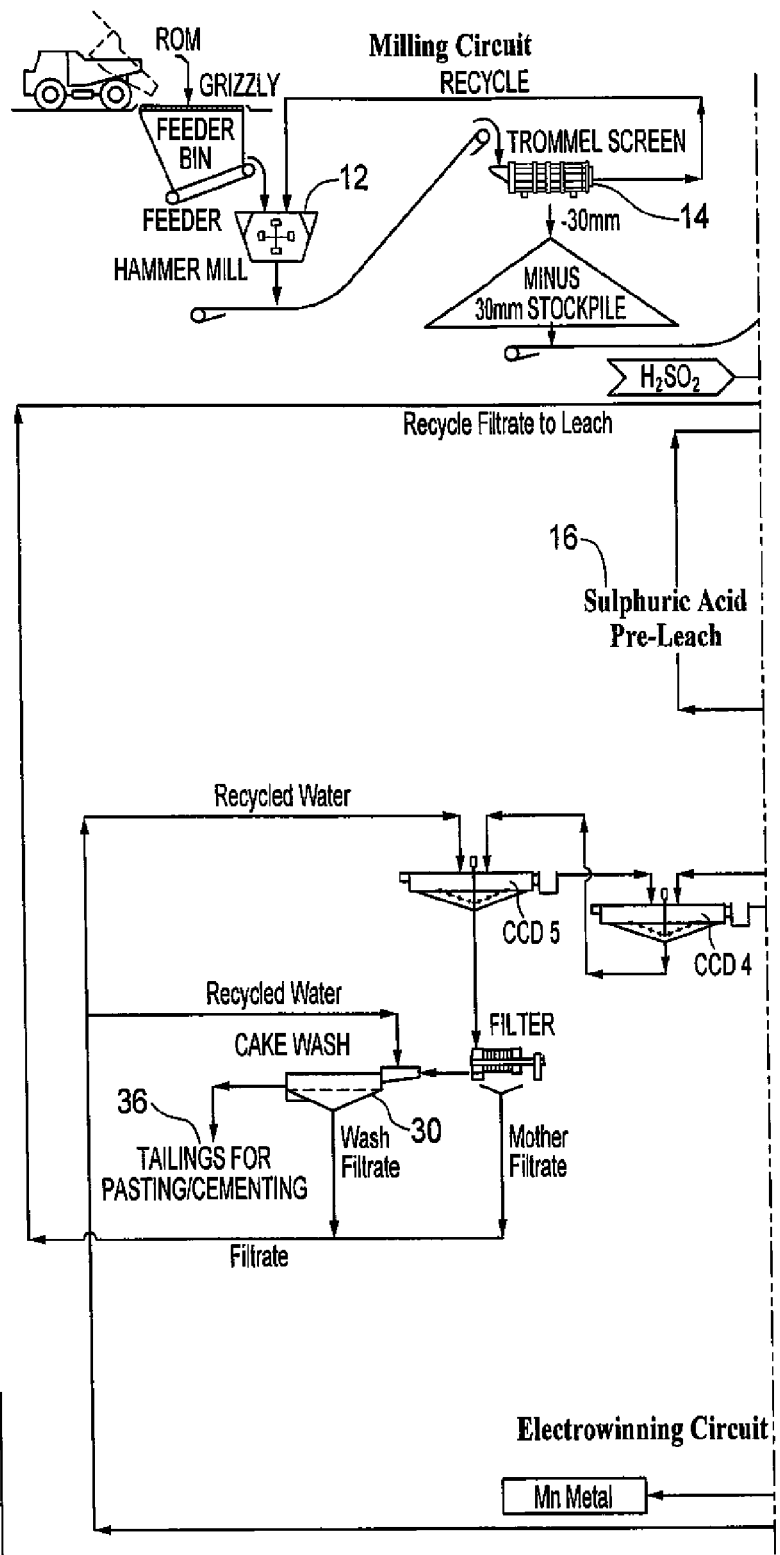
FIG. 2A is a diagram of the first portion of the overall system/process described herein.
Figure 2B:
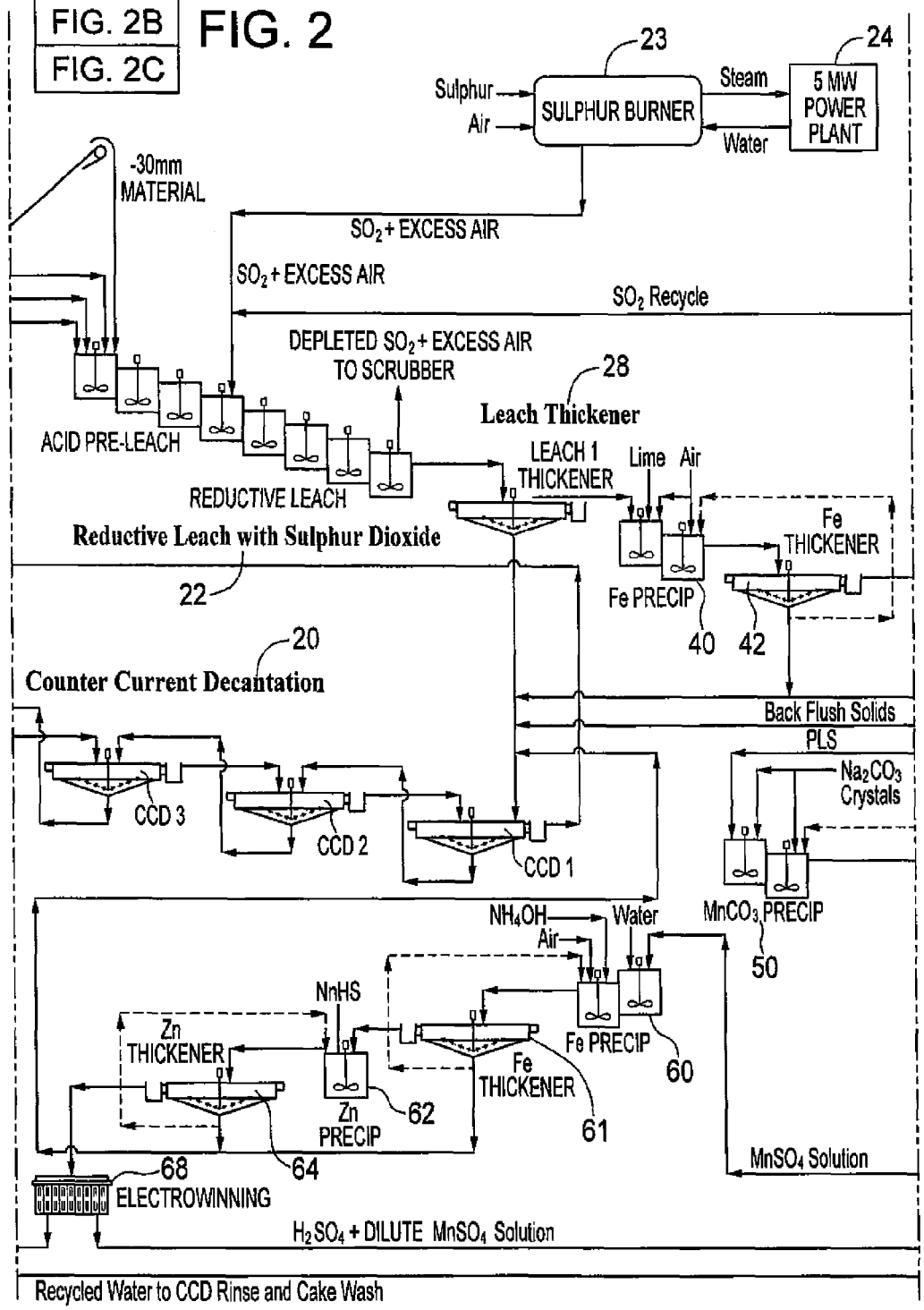
FIG. 2B is a diagram of a second portion of the overall system/process described herein.
Figure 2C:
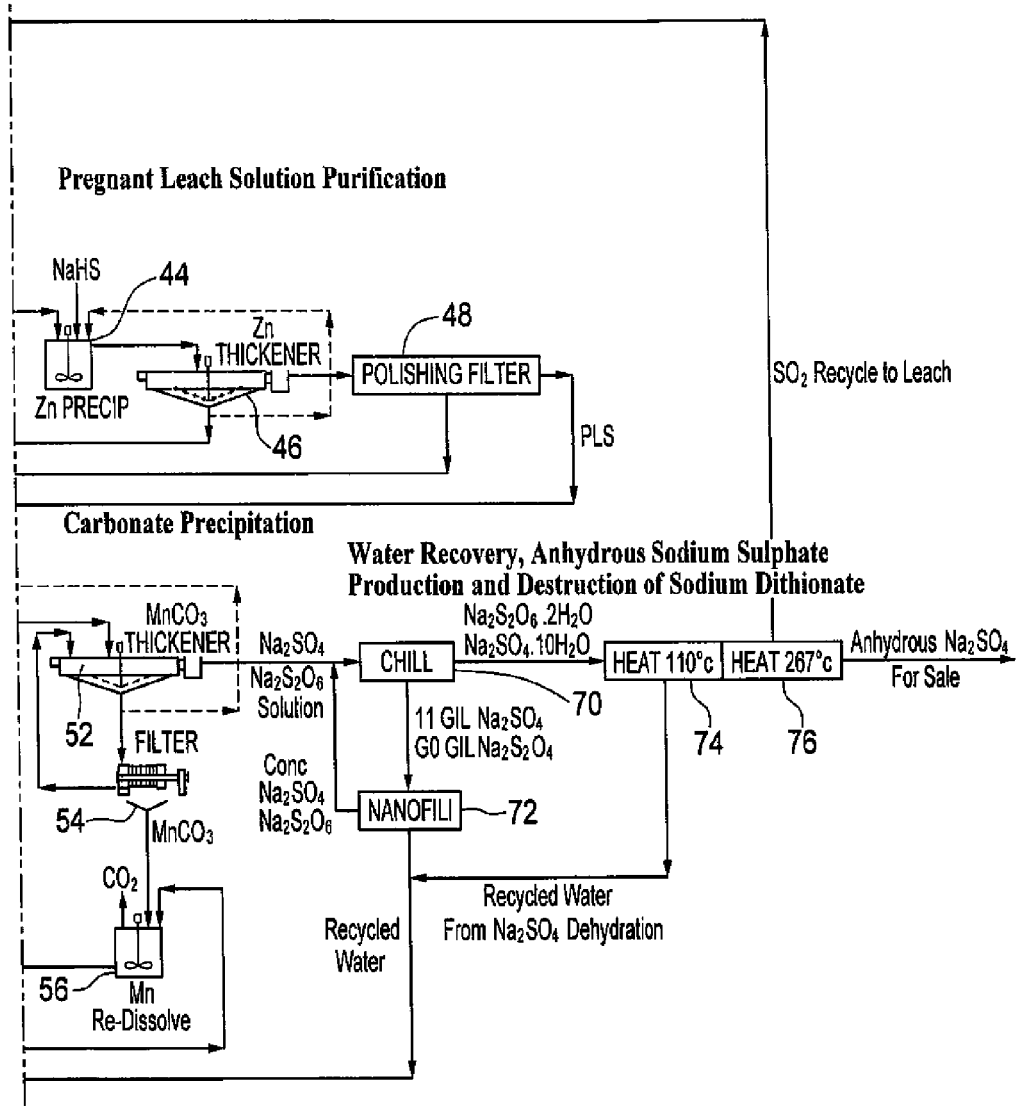
FIG. 2C is a diagram of a third portion of the overall system/process described herein.

FIG. 2 shows the overall system/process disclosed herein. Manganese dioxide containing resource material is fed through a grate into a hammer mill 12 and from there to a trommel screen 14. Minus 30 mm resource material is stockpiled for feed into a leach system, whereas oversized material is recycled back to the hammermill.

The minus 30 mm resource material from the milling circuit is preleached with a sulphuric acid solution in a series of stirred tanks shown at 16. The resource material pulp density is 12 to 20% by weight to facilitate subsequent solid liquid separation with a leach thickener. The resource material disintegrates into smaller particles as a result of the agitation at this stage. Acid consuming resource material, e.g. calcium and barium, react with the sulphuric acid to form insoluble sulphates. The make-up water for the pre-leach comes from the counter current decantation (CCD) system 20 wash and contains manganese recovered from washing the gangue material.

The sulphuric acid pre-leached slurry cascades into the sulphur dioxide reductive leach circuit, which consists of a series of stirred tanks 22. Sulphur dioxide gas is sparged into the slurry of the first leach tank to leach manganese dioxide containing minerals to yield manganous sulphate and manganous dithionate. Unused sulphur dioxide ($SO_2$) is collected from the head space of each tank and recycled into each subsequent leach tank. The sulphur dioxide depleted gas is then sent to a scrubber after the final leach tank. The sulphur dioxide reducing agent used in the process is produced by combusting elemental sulphur with 20% excess air, at 23. This produces a mixture of 17.5% sulphur dioxide, 79.0% nitrogen and 3.5% oxygen by volume. Heat exchanging the exhaust gas allows production of 20 tons per hour of steam at 400° C. and 45 bar pressure for 140 tons/day manganese metal output. In a condensing turbine, this steam can produce 5 megawatts of continuous electrical power, as shown at 24. An additional 2 megawatts of low grade heat is also available for thermal applications below 400° C.

After the leaching stage, the slurry enters a thickener 28 to substantially separate the pregnant leach solution (PLS) from the leached solids. Adequate settling is achieved by operating at a pulp density of 12 to 20% by weight without the need for auto-dilution (recycling of the overflow back to the same thickener) to increase the settling rates. Incoming water used in the leach contains manganese recovered from the CCD wash.

The underflow from the leach thickener containing leach solids and entrained PLS is washed through a multistage (e.g. 4 to 5 stage) CCD (counter current decantation) circuit 20. Clean recycled wash water is used to rinse the solids to recover entrained PLS at 30, while providing an adequately low pulp density (e.g. 12 to 20% by weight) to facilitate settling without auto-dilution. The wash solution containing recovered manganese is recycled back to the leach stage. The solid tailings shown at 36 with minimum water content are produced by filtration of the final CCD underflow, minimizing water requirements of the overall process. The tailings can then be mixed with waste aggregate and cement to create a high density paste fill which is returned to the worked out areas of the open pit. The tailings are benign with no ability to generate acid through oxidation.

The removal of impurities from the PLS is accomplished in two stages. In the first stage, aluminum, arsenic and silica are precipitated, shown at 40, by raising the pH to 6 in a mix tank. Aeration promotes the precipitation of iron as ferric solids. The increase in pH can be achieved by adding the raw resource material, which has sufficient alkalinity to raise the pH, or by the addition of lime. The solid precipitates are separated from the treated PLS in a thickener at 42. The overflow solution is then reacted in a mix tank at 44 with sodium hydrosulphide to precipitate metals, including zinc, as their sulphides. The sulphide precipitates are separated by a thickener 46 and the treated PLS is filtered with a polishing sand filter 48 to remove fine precipitate, resulting in a purified PLS containing mainly manganous sulphate and manganous dithionate solution.

Manganese is separated from the PLS by precipitation of solid manganous carbonate via mixing of sodium carbonate with the PLS at 50. The resulting solution by-product contains sodium sulphate and sodium dithionate. The solid manganous carbonate is separated from the sodium sulphate and sodium dithionate bi-product solution by a thickener 52. The wet manganous carbonate underflow is then dewatered in a filtration system 54 and rinsed at 56 producing a clean manganous carbonate intermediate product for feeding into an electrowinning circuit.

Manganous carbonate is dissolved as manganous sulphate with spent electrolyte recycled from the electrowinning cells. The manganous sulphate electrolyte will contain ammonium sulphate as a pH buffer and sulphite as a reducing agent to prevent oxidation of manganous ion in the bulk electrolyte solution. The electrolyte can be purified in two stages to remove impurities that may have concentrated into manganous carbonate feedstock during precipitation. Aluminum, arsenic and iron are removed by adjusting the pH to about 6 and sparging with air at 60. Thickening is provided at 61. The resulting solution can be purified a second time with the addition at 62 of sodium hydrosulphide (NaHS) to precipitate metals such as zinc as their sulphides. After separation of the resulting solids with another thickener at 64, the solution is of sufficient purity for the electrowinning high grade manganese metal.

The purified solution is introduced into the cathode compartment of a divided electrowinning cell 68. The spent catholyte with reduced manganous ion content is fed as anolyte into the anode chamber to regenerate sulphuric acid which can be recycled for manganous carbonate dissolution (electrolyte makeup).

Table 1 summarizes typical conditions for electrowinning manganese metal by the above approach:

TABLE 1

| Condition | Value |
|---|---|
| purified feed solution, catholyte | |
| Mn as $MnSO_4$, g/L | 30-40 |
| $(NH_4)_2SO_4$, g/L | 125-150 |
| $SO_2$, g/L | 0.30-0.50 |
| anolyte | |
| Mn as $MnSO_4$, g/L | 10-20 |
| $H_2SO_4$, g/L | 25-40 |
| $(NH_4)_2SO_4$, g/L | 125-150 |
| current density, mA/cm$^2$ | 43-65 |
| catholyte pH | 6-7.2 |
| anode composition | Pb + 1%. Ag |
| cathode composition | Hastelloy, type 316 stainless steel, or Ti |
| cell voltage, V | 5.1 |
| diaphragm | acrylic* |
| current efficiency % | 60-70 |

*Usually specified as to porosity.

The current system recovers water and destroys dithionates at significantly higher energy efficiency than processes described in the prior art. Efficient water recovery and efficient destruction of dithionates with sulphur dioxide recycle is one of the key aspects that enables the current invention to achieve low cost production of manganese metal from lower grade manganese dioxide containing resource material.

Most of the water used in the overall process occurs in the sodium sulphate, sodium dithionate containing solution that is produced after precipitation of manganous carbonate. Water recovery is achieved at high energy efficiency by significantly avoiding the high latent heat requirements of prior art water evaporation techniques. The current invention utilizes the fact that sodium sulphate and sodium dithionate solubility in water decrease significantly with decreasing temperature. Therefore, most of the sulphate along with a significant amount of sodium dithionate can be crystallized as solids by cooling (chilling) their solutions as shown at 70. The chilling to produce crystallization can be done under vacuum to reduce cooling requirements. For instance, with a vacuum, crystallization can occur in two stages, one at 29° C. and the other at 20° C. The vacuum can be accomplished by a venturi design, without the need for vacuum pumps. The resulting crystallizer liquor can be processed by a nanofiltration system 72 to remove water for recycling and concentrate the nanofiltration input liquor for recycling back to the crystallizer for re-chilling. The removed water can be used to rinse process tailings and then reused in the leaching process.

The crystal products from the chilled crystallizer contain sodium sulphate decahydrate and sodium dithionate dihydrate. The sodium sulphate decahydrate can be dehydrated by heating at 74 the mixed crystals to about 40° C. to form anhydrous sodium sulphate and sodium dithionate dihydrate. The sodium sulphate and sodium dithionate dihydrate solids can be heated to 267° C. at 76 to convert sodium dithionate dihydrate to additional anhydrous sodium sulphate, sulphur dioxide and a small amount of water. The sulphur dioxide and water can be recycled to the leach system. The anhydrous sodium sulphate crystals can be sold as a byproduct.

Table 2 illustrates the significant energy savings of the current invention water recovery vs. prior art evaporative technique for 140 tons per day manganese metal production and 50 gram/liter manganous ion containing pregnant leachate.

TABLE 2

| | MW |
|---|---|
| Power Requirement for Simple Evaporation | |
| Specific Heat to Raise Temperature From 25° C. to 100° C. | 8.83 |
| Latent Heat Requirements for Simple Evaporation | 63.53 |
| Low Grade Heat Recovery from Sulphur Burner Exhaust to 100° C. | −1.79 |
| Total Power with Simple Evaporation | 70.57 |
| American Manganese Water Recovery and Dithionate Destruction Process | |
| Power to Chill $Na_2SO_4$ + $Na_2S_2O_6$ Solution from 25° C. to 0° C. and Crystallize $Na_2SO_4 \cdot 10H_2O$ and $Na_2S_2O_6 \cdot 2H_2O$ | 7.77 |
| Power to Heat Crystals from 0° C. to 40° C. | 0.60 |
| Power for Nanofiltration | 0.25 |
| Power to Calcine $Na_2SO_4$ and $Na_2S_2O_6H_2O$ Crystals to 267° C. | 1.55 |
| Heat Recovery from Mother Liquid at 0° C. | −4.34 |
| Low Grade Heat Recovery from Sulphur Burner Exhaust for Calcine | −0.81 |
| Low Grade Heat Recovery from Sulphur Burner Exhaust for Heating Crystals | −0.60 |
| Total Power with American Manganese Process | 4.42 |

Accordingly a system and/or corresponding method is disclosed by which Manganous Sulphate/Dithionate liquors derived from Manganese resource material are processed to produce sodium sulphate and recovery of water with significant savings of energy compared to prior art systems.

What is claimed is:

1. A process for hydrometallurgical processing of manganese sulphate and manganese dithionate containing liquors and recovery of water therefrom, comprising the steps of:

deriving sodium sulphate and/or sodium dithionate containing liquors from manganese sulphate and manganese dithionate containing liquors;

crystallizing sodium sulphate decahydrate and sodium dithionate dehydrate by cooling sodium sulphate/sodium dithionate containing liquors with or without a vacuum;

heating the sodium sulphate decahydrate and sodium dithionate dehydrate crystals to a temperature sufficient to decompose the sodium sulphate decahydrate crystals to form anhydrous sodium sulphate crystals, sodium dithionate hydrate crystals and water;

removing water from the sodium sulphate and sodium dithionate hydrate crystals;

heating the sodium sulphate and sodium dithionate dehydrate crystals to form anhydrous sodium sulphate, sulfur dioxide and water or steam; and separating the anhydrous sodium sulphate from the sulfur dioxide and water.

2. The process of claim 1, wherein the sodium sulphate and sodium dithionate containing liquors are filtrates or cetrifugates derived from precipitation of manganous carbonate from leached manganese resource material by reaction of manganous sulphate and manganous dithionate with a carbonate.

3. The process of claim 2, wherein the carbonate is sodium carbonate.

4. The process of claim 3 wherein the sodium carbonate is an aqueous solution.

5. The process of claim 1, wherein the sulfur dioxide is suitable for use in leaching manganese resource material.

6. The process of claim 1, wherein the sodium sulphate and sodium dithionate containing liquors are nanofiltered to remove water therefrom.

7. The process of claim 1, wherein the manganous sulphate and manganous dithionate are derived from leaching of manganese resource material with sulfuric acid and sulfurous acid.

8. The process of claim 7, wherein the step of leaching the manganese resource material includes the use of sulfur dioxide.

9. The process of claim 1, including the step of precipitating aluminum, arsenic, silica and iron by a pH adjustment and aeration from the manganous sulphate and manganous dithionate liquors.

10. The process of claim 1, including the step of precipitating one or more metal impurities from the manganous sulphate and manganous dithionate liquors by sodium hydrosulphide.

11. The process of claim 9, wherein the metal impurities comprise one or more of the following metals: zinc, copper, lead, molybdenum, nickel and cobalt.

12. The process of claim 2 including using the sulfur dioxide and water in the step of leaching.

13. The process of claim 2, wherein manganese carbonate solids are derived along with the sodium sulfate and sodium dithionate containing liquors.

14. The process of claim 13, wherein the manganese carbonate solids are separated from the sodium sulfate and sodium dithionate by filtration or centrifugation.

15. The process of claim 14, wherein the manganese carbonate solids are water washed to remove soluble impurities and wherein the water washed manganous carbonate solids are reacted with a sulfuric acid to produce dithionate free manganous sulphate suitable for manganese metal electrowinning.

16. The process of claim 1, wherein the temperature of the cooling step is −40° C. or higher at atmospheric pressure.

17. The process of claim 1, wherein the temperature of the cooling step is −40° C. or higher under vacuum.

18. The process of claim 17, wherein the temperature of the cooling step is 20° C. or higher.

19. The process of claim 18, wherein the cooling temperature is approximately 29° C. at 0.0373 atmospheres in a first stage of cooling and approximately 20° C. in a second stage of cooling.

20. The process of claim 1, wherein the step of cooling includes two stages, under vacuum, wherein the first stage produces a concentrate of sodium sulphate and/or sodium dithionate containing liquors and the second stage produces sodium sulphate decahydrate and sodium dithionate crystals from the first-stage concentrate.

* * * * *